United States Patent
Han et al.

(10) Patent No.: US 7,903,510 B2
(45) Date of Patent: Mar. 8, 2011

(54) APPARATUS AND METHOD FOR REPRODUCING AUDIO FILE

(75) Inventors: Yong Hee Han, Sungnam-si (KR); Jong In Shin, Anyang-si (KR); Myung Gu Lee, Anyang-si (KR); Han Sang Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 11/602,370

(22) Filed: Nov. 21, 2006

(65) Prior Publication Data

US 2007/0064562 A1    Mar. 22, 2007

Related U.S. Application Data

(63) Continuation of application No. 11/199,150, filed on Aug. 9, 2005, now Pat. No. 7,158,456, which is a continuation of application No. 09/951,210, filed on Sep. 11, 2001, now Pat. No. 7,050,376.

(30) Foreign Application Priority Data

| Sep. 19, 2000 | (KR) | 2000-54776 |
| Sep. 19, 2000 | (KR) | 2000-54777 |
| Sep. 19, 2000 | (KR) | 2000-54778 |
| Oct. 5, 2000 | (KR) | 2000-58501 |

(51) Int. Cl.
*G11B 5/09* (2006.01)

(52) U.S. Cl. ............. 369/47.15; 369/59.25; 369/53.44

(58) Field of Classification Search .......... None
See application file for complete search history.

(56) References Cited

U.S. PATENT DOCUMENTS

| 4,180,802 | A | 12/1979 | Oosterhouse |
| 4,837,745 | A | 6/1989 | Eich et al. |
| 4,841,506 | A | 6/1989 | Kiyoura |
| 4,852,073 | A | 7/1989 | Shinohara |
| 4,899,331 | A | 2/1990 | Masaki |
| 4,922,476 | A | 5/1990 | Kiyoura |
| 4,949,322 | A | 8/1990 | Kimura |
| 5,228,021 | A | 7/1993 | Sato |
| 5,285,192 | A | 2/1994 | Johary |
| 5,298,912 | A | 3/1994 | Mano |
| 5,315,570 | A | 5/1994 | Miura et al. |
| 5,319,629 | A | 6/1994 | Henshaw et al. |

(Continued)

FOREIGN PATENT DOCUMENTS

DE    4208328 A    9/1993

(Continued)

OTHER PUBLICATIONS

Winamp Version, Nullsoft, Inc. v2.65(x86)- Aug. 14, 2000, Copyright @ 1997-2000, pp. 1-4.

(Continued)

*Primary Examiner* — Muhammad N Edun
(74) *Attorney, Agent, or Firm* — Birch, Stewart, Kolasch & Birch, LLP (57) ABSTRACT

A method of reproducing an audio file includes: identifying a type of audio data in the audio file based on an extension information of the audio file separated from but associated with the audio data of the audio file; and determining whether the audio file is reproducible by checking whether a part of the audio file constructs a specific format stream corresponding to the identified audio type.

62 Claims, 7 Drawing Sheets

U.S. PATENT DOCUMENTS

| | | | |
|---|---|---|---|
| 5,408,448 A | 4/1995 | Carman | |
| 5,489,451 A | 2/1996 | Omeis et al. | |
| 5,489,952 A | 2/1996 | Gove | |
| 5,499,373 A | 3/1996 | Richards et al. | |
| 5,578,231 A | 11/1996 | Schippers et al. | |
| 5,597,307 A | 1/1997 | Redford | |
| 5,633,842 A | 5/1997 | Nishida | |
| 5,644,558 A | 7/1997 | Inatani | |
| 5,671,377 A | 9/1997 | Bleidt | |
| 5,684,773 A | 11/1997 | Hayashi | |
| 5,701,384 A | 12/1997 | Park | |
| 5,749,735 A | 5/1998 | Redford | |
| 5,787,231 A | 7/1998 | Johnson | |
| 5,809,512 A | 9/1998 | Kato | |
| 5,825,726 A | 10/1998 | Hwang | |
| 5,832,171 A | 11/1998 | Heist | |
| 5,838,927 A | 11/1998 | Gillon | |
| 5,864,870 A | 1/1999 | Guck | |
| 5,896,099 A | 4/1999 | Yamauchi | |
| 6,005,563 A | 12/1999 | White | |
| 6,012,068 A | 1/2000 | Boezeman | |
| 6,094,684 A | 7/2000 | Pallmann | |
| 6,151,286 A | 11/2000 | Inoue | |
| 6,243,865 B1 | 6/2001 | Wei | |
| 6,292,440 B1* | 9/2001 | Lee | 369/7 |
| 6,304,523 B1 | 10/2001 | Jones | |
| 6,334,104 B1 | 12/2001 | Hirai | |
| 6,338,044 B1 | 1/2002 | Cook | |
| 6,351,442 B1 | 2/2002 | Tagawa | |
| 6,353,173 B1 | 3/2002 | D'Amato | |
| 6,362,409 B1 | 3/2002 | Gadre | |
| 6,366,953 B2 | 4/2002 | Inoue | |
| 6,388,766 B1 | 5/2002 | Inoue | |
| 6,388,960 B1 | 5/2002 | Furukawa | |
| 6,560,577 B1 | 5/2003 | Gilbert et al. | |
| 6,567,847 B1 | 5/2003 | Inoue | |
| 6,587,404 B1 | 7/2003 | Keller | |
| 6,587,855 B1 | 7/2003 | Ellmann | |
| 6,609,105 B2 | 8/2003 | Story et al. | |
| 6,721,489 B1 | 4/2004 | Benyamin | |
| 6,721,710 B1 | 4/2004 | Lueck et al. | |
| 6,742,176 B1 | 5/2004 | Million | |
| 6,937,814 B1 | 8/2005 | Chasen | |
| 7,065,287 B1 | 6/2006 | Heredia et al. | |
| 7,158,456 B2 | 1/2007 | Han et al. | |
| 2002/0054218 A1 | 5/2002 | Kobayashi | |

FOREIGN PATENT DOCUMENTS

| | | |
|---|---|---|
| DE | 4208328 C2 | 9/1993 |
| EP | 772192 | 5/1997 |
| FR | 2703815 | 4/1993 |
| FR | 2703815 A | 10/1994 |
| JP | 11-282596 | 10/1999 |
| KR | 1998-033061 | 7/1998 |
| KR | 2000-0014132 A | 3/2000 |
| KR | 2000-0067175 | 11/2000 |
| KR | 2002-0022143 | 3/2002 |
| KR | 2002-0022144 | 3/2002 |
| KR | 2002-0022145 | 3/2002 |
| KR | 2002-0027809 | 4/2002 |
| WO | WO-90/09661 A | 8/1990 |
| WO | WO 90/09661 A1 | 8/1990 |
| WO | WO-93/03427 A | 2/1993 |
| WO | WO 93/03427 A2 | 2/1993 |

OTHER PUBLICATIONS

A Tutorial on MPEG Audio Compression (Pan)(1995).
AC2 & AC3 Low Complexity Transform-Based Audio Coding (Fielder)(1995).
AlsaPlayer Version 0.99.32 (Apr. 14, 2000) with the source code.
Applelinks: The Ultimate Macintosh resource; Eight MP3 Players for the Macintosh; http://www.applelinks.com/mooresviews/players.shtml; download Jan. 16, 2008 11:55.
ATPM; About This Particular Macintosh 6.03: About the personal computing experience; vol. 6, No. 3, Mar. 1, 2000.
Audio Interchange File Format 1.3 (Jan. 4, 1989).
Audion 1.5; Panic-Audion, the collest MacOS MP3/ CD/Net player; http://web.archive.org/web/20000815065948/www.panic.com/audion; downloaded Jan. 16, 2008 9:50AM.
Audion Version 1.5 MP3/CD Player (Released Mar. 3, 2000).
Business Wire - Fraunhofer IIS: Happy Birthday MP3!. (Jul. 13, 2005).
Car MP3 Player for people who love mpeg music or mobile DJ's; Carplayer.com; http://web.archive.org/web/20000301150653/www.carplayer.com/controls.html; downloaded Jan. 15, 2008.
Car MP3 player for people who love mpeg music or mobile DJ's; Carplayer.com; http://web.archive.org/web/20000302023246/www.carplayer.com/specs.html; downloaded Jan. 15, 2008.
Car MP3 player for people who love mpeg music or mobile DJ's; carplayer.com; http://web.archive.org/web/20000815061630/http://www.carplayer.com/; downloaded Jan. 15, 2008.
Car MP3 player for people who love mpeg music or mobile DJ's; carplayer.com; http://web.archive.org/web/20000815200453/www.carplayer.com/mp3cd.html; downloaded Jan. 15, 2008.
Car MP3 player for people who love mpeg music or mobile DJ's; Plans & Components - News; http://www.carplayer.com/news.html; downloaded Jan. 16, 2008.
CD-DA System Description Subcode Channels R-W (Nov. 1991) § 5.3.
CD-Text Standard (Sep. 1996) Chapter 5.8.
Cobra CD 0001\codes_5_10_\pictures\Cobra II + box\New APP\another shoot of c2 playing mp3 cd.jpg;.
Cobra CD 0001\codes_5_10_2001\pictures\Cobra II + box\New APP\c2 playing mp3 cd.jpg;.
Cobra CD 0002\lcdcodes\airdll\ir.c.
Cobra CD 0002\lcdcodes\cdrom\cdrom.cpp.
Cobra CD 0002\lcdcodes\mp3player2\Cobra\cobra.pbl.
Cobra CD 0002\lcdcodes\mydll\mydll.cpp;.
Defendants' Invalidity Contentions Claim Charts for the '456 Patent; pp. 1-64 for *LG Electronics Inc.* v. *Hitachi, Ltd,* Case No. 5:07-CV-90 (DF) (E.D. Tex). (Jan. 26, 2009).
Defendants' Preliminary Invalidity Contentions for the '456 Patent; pp. 1-99 for *LG Electronics Inc.* v. *Hitachi, Ltd,* Case No. 5:07-CV-90 (DF) (E.D. Tex);(Nov. 6, 2008).
Defendants' Invalidity Contentions and Defendants' Jul. 17, 2008 technology tutorial materials for *LG Electronics Inc.* v. *Hitachi, Ltd,* Case No. 5:07-CV-90 (DF) (E.D. Tex).
Diamond Rio PMP300 Player with MusicMatch JukeBox Software and User's Guide(Copyright 1998).
Donald Spencer - Webster's New World Dictionary of Computer Terms, Fourth Edition (1992), p. 159.
Douglas Smith - MicroSoft Windows Media Player 6.1, Features for Everybody, http:cws.internet.com/article/1767-2131.htm.
Dowining, et. al - Dictionary of Computer and Internet Terms, Fifth Edition (1996), pp. 136-137.
ECMA 119, 2nd ed. (Dec. 1987, reprinted Sep. 1998): §§ 7.5, 12.3.
ECMA 130, 2nd ed. (Jun. 1996) § 22.3.
EETimes -Under the Hood: The MP3 that broke new Ground (David Carey) pp 1, Dec. 17, 2007.
Enhanced Music CD Specification (Dec. 1995): Chapter III.
FreeAmp Version 2.1 Beta 7 (Released Aug. 25, 2000).
GQmpeg Version 0.6.3 (Released Jul. 3, 1999).
Hitachi CDR-8130 (1997).
Hitachi CDR-8430 (1997).
ID3v2 (Mar. 26, 1998).
ID3v2.3 (Feb. 3, 1999).
IEC 60908 (Feb. 1999): § 26.
IEC 61866 (Aug. 1997) §§ 1, 2.3.2, 2.3.4; 3.7.4 (p. 79).
Int'l Std. ISO/IEC 11172, 1st ed. (1993).
Int'l Std. ISO/IEC 11172-3, 1st ed., (1993).
Int'l Std. ISO/IEC 13818, 2nd ed. (1998).
Int'l Std. ISO/IEC 13818-3, 2nd ed., (1998).
Int'l Std. ISO/IEC TR 11172-5, 1st ed., 1998 Part 2 (source code): Source code file Audio/Common.C, in. 270-81, 409-29, 1352-77, 1390-414, 1471-532; Audio/Decode.C, In. 744-85; Audio/Musicout. C, In. 342-52, 380-90.
Int'l Std. ISO/IEC TR 11172-5, 1st ed., 1998: pp. 2, 3, 9, 10.
International Herald Tribune - MP3 developer yields royalty riches (O'Brien).

IP-512 Technical Manual: Multibus, Oct. 1984, Imaging Technolog Inc. pp. 2-5, 2-6, 2-7, 5-7, 5-8, 7-10 and 7-11.
ISO 9660 (1988) §§ 7.5, 12.3.
ISO MPEG-1 Audio (Brandenburg) (1994).
ISO/IEC MPEG-2 Advanced Audio Coding (Bosi)(1997).
Jeremy Briggs Cobra II Player, Source Code and Documentation (2000).
Jeremy Briggs MP3 Player Plans and Software Products and Documentation (1998).
Jeremy Briggs MP-ROM Player, Plans and Components, and Portable MP3/CD Player (1999).
Jeremy Briggs MPROM Product and Documentation (1999).
Jeremy Briggs Portable MP3/CD Player and Documentation (2000).
Joliet Standard (1988): pp. 9, 11.
Jonar C. Nader - Prentice Hall's Illustrated Dictionary of Computing (1992), p. 170.
JVC XU-301BK MD-CD Combination Deck: Service Manual (Apr. 1998) pp. 1-1, 1-3, 1-11 - 1-21, 1-28 -1-30.
KJukeBox Version 0.1.2 (Released Feb. 13, 1999);.
KMPG Music Player Version 981104 (Released Nov. 23, 1998).
Knight Rider MP3 Player (KRMP3). (May 16, 2000).
*LG Electronics Inc.* v. *Hitachi, Ltd,* Case No. 5:07-CV-90 (DF) (E.D. Tex); Defendants' Preliminary invalidity contentions and accompanying document production pusuant to patent rules 3-3 and 3-4; dated Jan. 26, 2009;.
LGE ADR-700/Harmon Kardon CDR30 player and User Manual (2000).
Michael F. Hordeski - McGraw Hill Illustrated Dictionary of Personal Computer Terms, Fourth Edition (1995), p. 173.
Micronas MAS 3507D MP3 Decoder & Data Sheet (1998).
Micronas MAS 3507D MPEG 1/2 Layer 2/3 Audio Decoder Preliminary Data Sheet (Oct. 21, 1998): pp. 4-7, 12, 22, 23, 36-37.
Microsoft Computer Dictionary, Fourth Edition (1999), pp. 175, 183-84.
MP3 Power with Winamp! (1999)(Frankel):pp. 8, 19, 23, 34, 35, 47-51, 54, 57, 58, 60-63, 105-106, 108, 112-120.
MP3 The Definitive Guide, 1st ed. (Mar. 2000)(Hacker): pp. 2, 41-44, 48, 50, 51, 54-95, 116-133, 207, 331, 370.
Multimedia Programming Interface and Digital Data Specification 1.0 (Aug. 1991)(IBM & Microsoft).
Multi-Session (Dec. 1995): Chapter III.
Newman et al., Principles of Interactive Computer Graphics, Second Edition (1979).
Overview of MPEG Audio (Brandenburg) (1997).
Overview of MPEG audio coding (Bosi) (1997).
Principles of Digital Audio, 3rd ed. (1995)(Pohlmann): chapters 8, 9, and 12.
Principles of Digital Audio, 4th ed. (Feb. 15, 2000) (Pohlmann): chapters 8, 9, and 11, and pp. 327-343, 502, 523-525.
RealJukebox 1.0 (1999).
RealJukebox Version 1.0.0.439 (Released 1999).
Red Book (1980): pp. 39-48.
Review: Audion; Copyright 2000 by Gareth Jones; Last updated Nov. 28, 2000; http://modena.intergate.ca/personal/gslj/audion.html.
Rio PMP300 Player: User's Guide (1998) pp. 1-24.
Simon Collin - Dictionary of Personal Computing and the Internet (1997), p. 72.
Sonique Music Player Version 0.75.b (Released Feb. 9, 1999).
Sony CDP-0500/CDP-C400/CDP C44/CDP-C401 Compact Disc Player Operating Instructions (1989): pp. 1, 2, 6, 7, 9-12 and 13.
Sony CDU-711 CH(1999). http://web.archive.org/web/199902210825517 downloaded on Oct. 7, 2008.
Sony CDU-948S/X (1999). http://web.archive.org/web/19990221015517, downloaded on Oct. 7, 2008.
Sony MXD-D1 CD/Minidisc Player (1998).
Sony MXD-D3 Compact Disc/MiniDisc Deck Operating Instructions (1999): pp. 1, 2, 6, 7, 10-11, 13-15, 27-28, 31-35, 38.
The AudioReQuest ARQ1 User's Manual. pp. 3, 16-19, 25, 35, 36. (May 2000).
The Register - MP3 is ten years old today, Tony Smith(Jul. 14, 2005).
The Winn L. Rosch Hardware Bible; Winn L. Rosch, Brady Publishing; pp. 1-37 (1992).
White Book (Apr. 1995).
Winamp Version 2.05 (Released and on sale Nov. 15, 1998).
Winamp Version 2.11 (Released and On Sale Apr. 13, 1999).
Winamp version 2.12 "Nullsoft Winamp - About" screen from CD packaged with MP3 Power! with Winamp.
Winamp Version 2.12SE (Released Apr. 29, 1999; sold with MP3 Power! with Winamp).
Winamp Version 2.60 (Released on or before Feb. 14, 2000).
Winamp Version 2.65 (Released on or before Aug. 25, 2000).
Windows Media Player 7.0, Released Jul. 17, 2000.
Windows Media Player Version 6.1 (Released Jun. 25, 1998).
Windows Media Player Version 6.4, Released in 1999.
X11Amp Music Player Version 0.9 Alpha 3 (Released Feb. 14, 1999).
XMMS Version 0.9.1 (Released Jun. 19, 1999).
XMMS Version 0.9.5.1 (Released on or before Oct., 25 1999).
Yellow Book (1988): pp. 39-48.
YP-D40NP-B32 User's Guide: pp. 3, 6, 12-17, 34, 35, 38, 46, 48, 49 (MP3 Mode) & 3, 6, 20-23, 48 (Voice Mode).
YP-E32/YP-E64 User's Guide (date stamped Oct. 23, 1999): pp. 2, 4, 6-9, 12-15, 23, 25-27, 29, 37, 38, 47.
US-H84; Bumgardner; Jul. 1, 1986.
Operating Systems Concepts and Design (1987)(Milenkovic): pp. 323, 350, 455.

* cited by examiner

< MP3 Stop Mode >

Fig 9

< MP3 Reproducing Mode>

APPARATUS AND METHOD FOR REPRODUCING AUDIO FILE

CROSS-REFERENCE TO RELATED APPLICATIONS

This application is a Continuation of application Ser. No. 11/199,150, filed on Aug. 9, 2005, now U.S. Pat. No. 7,158,456 which is a Continuation of application Ser. No. 09/951,210, filed on Sep. 11, 2001, now U.S. Pat. No. 7,050,376, for which priority is claimed under 35 U.S.C. § 120. This application also claims priority under 35 U.S.C. §119(a) on Patent Application No. 54776/2000 filed in Korea on Sep. 19, 2000, Patent Application No. 54777/2000 filed in Korea on Sep. 19, 2000, Patent Application No. 54778/2000 filed in Korea on Sep. 19, 2000, and Patent Application No. 58501/2000 filed in Korea on Oct. 5, 2000. The entire contents of all of the above-identified applications are hereby incorporated by reference.

BACKGROUND OF THE INVENTION

1. Field of the Invention

The present invention relates to an optical disc player, and more particularly to an optical disc player and a method for reproducing thereof, which enable discriminates a kind of an inserted disc at the optical disc player.

2. Description of the Related Art

As a compact disc player has an immense popularity among many, an audio compact disc also has been growing to a key audio medium based on its excellent sound quality. In addition, since portable compact disc players are widely supplied, everyone is able to listen to a lot of music through portable compact disc players anywhere.

Meanwhile, as a double deck type audio compact disc player is now available, anyone can make his own compact discs by recording his voice or dubbing his favorite music from other compact discs, all without a computer operation.

In addition, through the Internet, it became easier for people to listen to music on a computer, where a number of music is saved in MP3 files. The MP3 means the audio compression technology of a high sound quality standardized in MPEG1. People usually download MP3 files or music through a network such as the Internet. Accordingly, portable MP3 file displayers for reproducing these MP3 files or music have been widely supplying to the markets.

Meanwhile, the study of optical disc players, which is reproducing the audio and MP3 files or music at one player, have been actively developing in the field of activating a utilization for the MP3 file or music.

However, the MP3 and the audio files and music have different data formation and construction. Accordingly, the optical disc players have to check the file formation and construction for inserted disc and perform a suitable reproducing process according to the checking result that of discriminating the disc kind in order to normally reproduce the files or music recorded onto the inserted disc by the optical disc player.

SUMMARY OF THE INVENTION

It is, therefore, an object of the present invention to provide an optical disc player and a method for reproducing thereof, which can discriminate a kind of inserted disc with the audio file disc, the MP3 file disc, and the general data file disc and normally performs the reproducing operation for the files or music recorded onto the inserted disc.

To achieve the above and other objects, there is provided according to an embodiment a method of reproducing an audio file, comprising: identifying a type of audio data in the audio file based on an extension information of the audio file separated from but associated with the audio data of the audio file; and determining whether the audio file is reproducible by checking whether a part of the audio file constructs a specific format stream corresponding to the identified audio type.

In another aspect of the present invention, an apparatus for reproducing an audio file, as embodied, comprises: a file type identifier for identifying a type of audio data in the audio file based on an extension information of the audio file separated from but associated with the audio data of the audio file; and a checking controller for determining whether the audio file is reproducible by checking whether a part of the audio file constructs a specific format stream corresponding to the identified audio type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
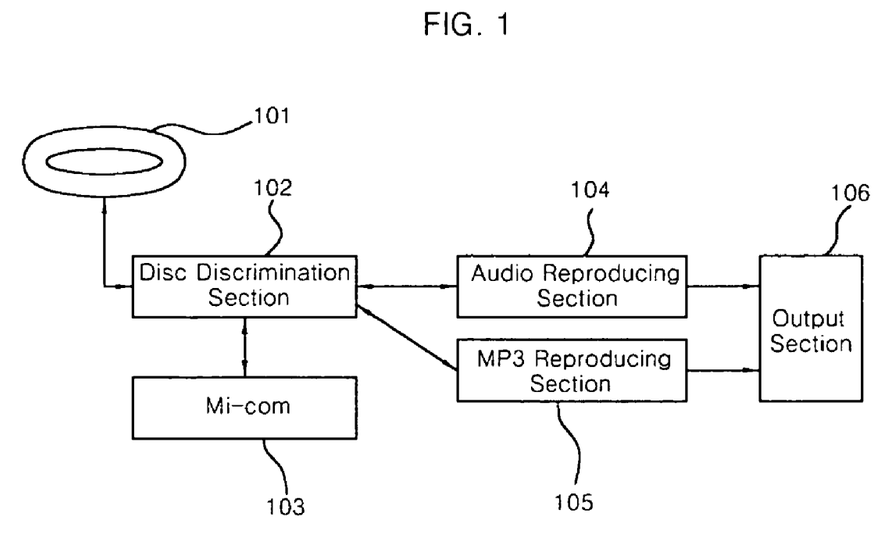
FIG. 1 is a block diagram illustrating a construction of an optical disc player which can reproduce an MP3 file or music according to the present invention.

FIG. 1 is a block diagram illustrating a construction of an optical disc player which can reproduce an MP3 file or music according to the present invention.

With reference to FIG. 1, the optical disc player of the present invention includes a disc 101 for receiving a disc; a disc discrimination section 102 for discriminating an attribution of the file or music recorded onto the disc inserted into the disc 101; a mi-com 103 for controlling an overall operation of the optical disc player; an audio reproducing section 104 for reproducing an audio file or music provided from the disc discrimination section 102; an MP3 reproducing section 105 for reproducing an MP3 file or music provided from the disc discrimination section 102; and an output section 106 for outputting output signals provided from the audio reproducing section 104 or the MP3 reproducing section 105.

Figure 2:
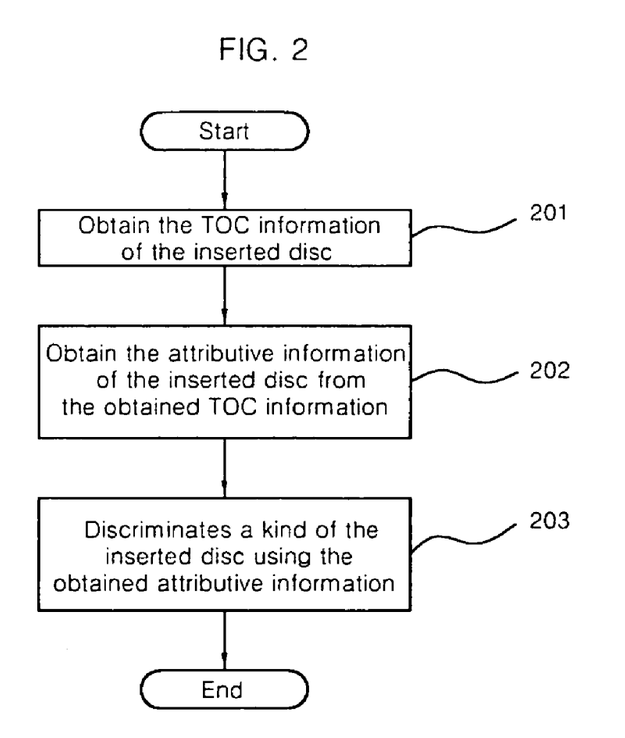
FIG. 2 is a flow chart illustrating the state of discriminating a kind of an inserted disc at an optical disc player in which a method of discriminating the optical disc according to the present invention is applied.

Now, a process for discriminating a kind of an inserted disc at the optical disc player will be explained referring to the FIG.2. FIG. 2 is a flow chart illustrating the state of discriminating the kind of an inserted disc at the optical disc player in which a method of discriminating the optical disc according to the present invention is applied.

First, the disc discrimination section 102 obtains the TOC (Table Of Content) information of the inserted disc 101 (201 step). The TOC information means that of a file or music attribution, a file or music number, each file or music playing time, and each file or music address recorded onto the disc.

Meanwhile, the disc discrimination section 102 obtains the attributive information of the inserted disc 101 from the obtained TOC information (202 step) after obtaining the TOC (Table Of Content) information of the inserted disc.

Here, the disc discrimination section 102 of the optical disc player obtains the attributive information of the file or music recorded onto the inserted disc 101 in a manner that of perceiving the attribution using an extension of the disc file from the TOC information obtained from the inserted disc 101.

For example, if the extension of the inserted disc 101 is "mp3", the disc discrimination section 102 discriminates the disc file as an MP3 file and then the MP3 reproducing section 105 reproduces the MP3 file. If the extension of the inserted disc 101 is "wav", the optical disc player discriminates the disc file as an audio file and then the audio reproducing section 104 reproduces the MP3 file.

The disc discrimination section 102 discriminates a kind of the inserted disc 101 using the obtained attributive information, and can normally reproduce the file or music recorded onto the disc according to a suitable reproducing method (203 step).

Meanwhile, the optical disc player can not normally reproduce the file or music if the attribution of the file or music are wrongly recorded onto the tracks in a case that the disc discrimination section 102 obtains the TOC information of the inserted disc and discriminates the kind of the disc using the attributive information of the inserted disc from the obtained TOC information.

Figure 3:
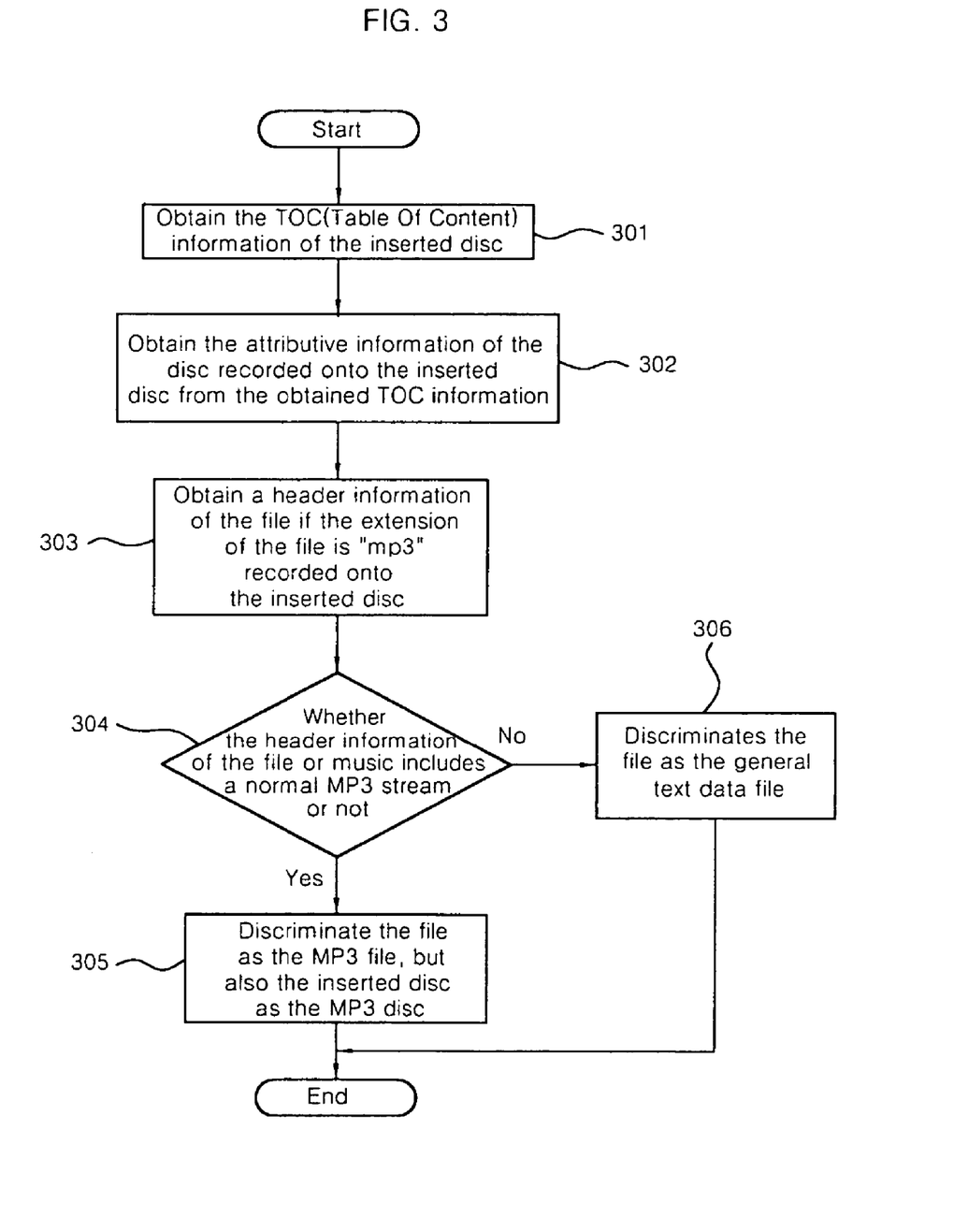
FIG. 3 is a flow chart illustrating the state of discriminating a general text data and an MP3 data recorded onto an inserted disc at an optical disc player in which a method of discriminating the optical disc according to the present invention is applied.

Now, a process of reproducing the file recorded onto the disc will be explained referring to FIG. 3 when the attribution of the file or music is recorded by the MP3 formation. FIG. 3 is a flow chart illustrating the state of discriminating a general text data and the MP3 data recorded onto the inserted disc the an optical disc player in which a method of discriminating the optical disc according to the present invention is applied.

First, the disc discrimination section 102 of the optical disc player obtains the TOC(Table Of Content) information of the inserted disc 101 (301 step). Subsequently, the disc discrimination section 102 obtains the attributive information of the file or disc recorded onto the inserted disc 101 from the obtained TOC information (302 step).

In this stage, the disc discrimination section 102 obtains a header information of the file or music if the extension of the file or music is "mp3" recorded onto the inserted disc 101 as a result of obtaining the attributive information of the file or disc at 302 step (303 step). Here, the header information can be selectively obtained by the disc discrimination section 102 or the MP3 reproducing section 105 depend upon a designed structure for the optical disc player.

For example, the disc discrimination section 102 can forward a command of reproducing the file or music to the MP3 reproducing section 105 if the extension of the file or music is "mp3" as the result of 302 step. Accordingly, the MP3 reproducing section 105 can be constructed to obtain the header information for the forwarded file or music.

While, the optical disc player discriminates whether the header information of the file or music includes a normal MP3 stream or not by using the header information of the file or music obtained at 303 step (304 step).

At this stage, the disc discrimination section 102 not only discriminates the file or music as the MP3 file or music, but also the inserted disc as the MP3 disc, if the header information of the file or music recorded onto the disc includes the normal MP3 stream as the result of 304 step (305 step).

Here, the discriminating operation is performed during the reproducing time of the other MP3 file or music, when the disc discrimination section 102 discriminates whether the MP3 file or music is normal state or not by using the header information of the file or music obtained from the MP3 reproducing section 105.

Also, the optical disc player can be designed not to effect the reproducing operation for MP3 file or music in view of an overall reproducing conditions even if an objected file or music is an abnormal MP3 file or music even if an objected file or music is an abnormal MP3 file or music, since the discrimination operation is performed during much less than a second and the optical disc player skips the abnormal file or music to a next file or music.

Meanwhile, the disc discrimination section 102 discriminates the file or music as the general text data file or music, if the header information of the file or music recorded onto the disc does not include the normal MP3 stream as the result of 304 step (306 step). Accordingly, the audio reproducing section 104 or the MP3 reproducing section 105 skips the abnormal file or music and reproduces the next file or music.

According to the optical disc player of the present invention, there is provided the advantages that of discriminating the kind of inserted disc with the audio file disc, the MP3 file disc, and the general data file disc and normally performing the reproducing operation for the files or music recorded onto the inserted disc.

Figure 4:
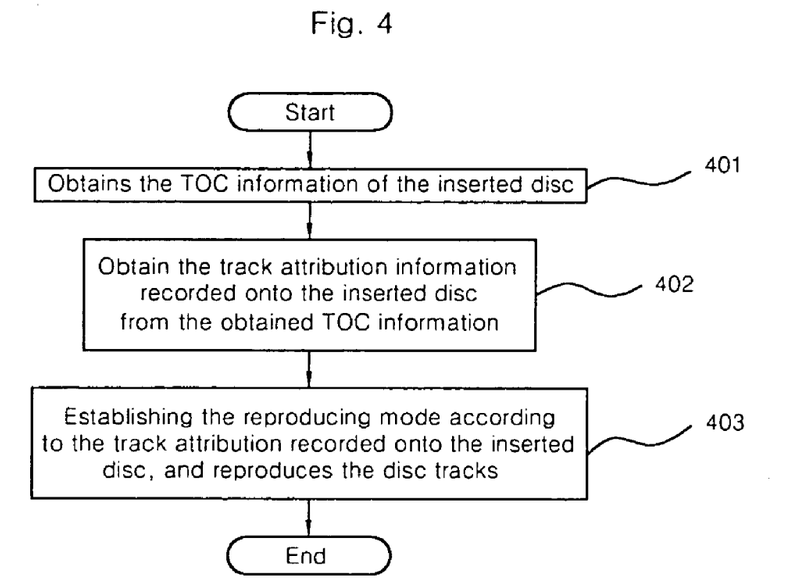
FIG. 4 is a flow chart illustrating the state of reproducing an optical disc according to a track attribution recorded onto an inserted disc at an optical disc player in which a method of discriminating the optical disc according to the present invention is applied.

FIG. 4 is a flow chart illustrating the state of reproducing an optical disc according to a track attribution recorded onto an inserted disc at an optical disc player in which a method of discriminating the optical disc according to the present invention is applied.

Now, a method of reproducing the disc at the optical disc player according to the present invention will be explained with reference to FIGS. 1 and 4.

First, the disc discrimination section 102 of the optical disc player obtains the TOC information of the inserted disc 101 (401 step). Subsequently, the disc discrimination section 102 obtains the tracks recorded onto the inserted disc 101 with an audio track, an MP3 track, and so on from the obtained TOC information at 401 step (402 step).

In this stage, the disc discrimination section 102 obtains the attribution of each track by referring the extension information of each track from the obtained TOC information. For example, the disc discrimination section 102 discriminates the object track as the audio tracks if the track extension is "wav", and as the MP3 tracks if the track extension is "mp3".

Meanwhile, the optical disc player establishes a reproducing mode according to the track attribution recorded onto the inserted disc 101, and reproduces the disc tracks (403 step). At this time, the optical disc player performs the reproducing operation according to the established reproducing mode and the track attribution recorded onto the disc.

Now, the operation of reproducing the inserted disc onto the optical disc player will be explained for each case.

1. A case that the reproducing mode of the optical disc player is established in an MP3 off mode.

a1. A case of merely recording the audio tracks onto the inserted disc

If the user inputs a play key, the optical disc player reproduces from an audio track number 1.

If the user inputs a random selection key, the optical disc player selectively reproduces the audio track.

If the user inputs a digit(s), the optical disc player reproduces the audio track corresponding to the corresponding digit, or reproduces from the audio track number 1 with displaying "input error message" if the audio track number corresponding to the number is not exist.

b1. A case of recording both the audio and the MP3 tracks onto the inserted disc If the user inputs the play key, the optical disc player reproduces from an audio track number 1.

If the user inputs the random selection key, the optical disc player selectively reproduces the audio track.

If the user inputs the digit(s), the optical disc player reproduces the audio track corresponding to the corresponding digit, or reproduces from the audio track number 1 with displaying "input error message" if the audio track number corresponding to the number is not exist.

c1. A case of recording the MP3 tracks onto the inserted disc

If the user inputs the play key, the optical disc player changes the established reproducing mode to the MP3 on mode, and reproduces from the MP3 track number 1.

If the user inputs the random selection key, the optical disc player changes the established reproducing mode to the MP3 on mode, and selectively reproduces the MP3 track.

If the user inputs the digit(s), the optical disc player changes the established reproducing mode to the MP3 on mode, and reproduces the MP3 track corresponding to the corresponding digit, or reproduces from the MP3 track number 1 with displaying "input error message" if the MP3 track number corresponding to the number is not exist.

2. A case that the reproducing mode of the optical disc player is established in an MP3 on mode.

a2. A case of merely recording the audio tracks onto the inserted disc

If the user inputs the play key, the optical disc player changes the established reproducing mode to the MP3 off mode and reproduces from the audio track number 1.

If the user inputs the random selection key, the optical disc player changes the established reproducing mode to the MP3 off mode and selectively reproduces the audio track.

If the user inputs the digit(s), the optical disc player changes the established reproducing mode to the MP3 off mode and reproduces the audio track corresponding to the corresponding digit, or reproduces from the audio track number 1 with displaying "input error message" if the audio track number corresponding to the number is not exist.

b2. A case of recording both the audio and the MP3 tracks onto the inserted disc If the user inputs the play key, the optical disc player reproduces from the MP3 track number 1.

If the user inputs the random selection key, the optical disc player selectively reproduces the MP3 track.

If the user inputs the digit(s), the optical disc player reproduces the MP3 track corresponding to the corresponding digit, or reproduces from the MP3 track number 1 with displaying "input error message" if the MP3 track number corresponding to the number is not exist.

c2. A case of recording the MP3 tracks onto the inserted disc

If the user inputs the play key, the optical disc player reproduces from the MP3 track number 1.

If the user inputs the random selection key, the optical disc player selectively reproduces the MP3 track.

If the user inputs the digit(s), the optical disc player reproduces the MP3 track corresponding to the corresponding digit, or reproduces from the MP3 track number 1 with displaying "input error message" if the MP3 track number corresponding to the number is not exist.

Meanwhile, the user performs the reproducing operation by inputting one of the play key, the random selection key, and the digit(s) key after inserting the disc into the optical disc player when a command for reproducing the disc track is forwarded to the optical disc player by the user.

Also, the user can perform the reproducing operation by inputting one of the play key, the random selection key, and the digit(s) key under condition that of putting the disc on a tray of the disc at an open state of the disc tray. In this case, the optical disc player closes the tray according to the reproducing command inputted from the user, and performs the general reproducing operation.

Also, it is considered that the optical disc player displays a message of non-existing the corresponding track and transits an waiting state for waiting a user command, if a disc which is not correspond to a present reproducing mode is inputted depend on a design of the optical disc player.

For example, the optical disc player displays a message of "No MP3" for the reproducing command inputted from the user and performs the waiting state for waiting a next command, if the current reproducing mode is the MP3 on mode and the audio track is merely recorded onto the inserted disc.

According to the method of reproducing the optical disc player which can reproduce the audio and the MP3 tracks, there is provided the advantages that of discriminating the attribution information of the track recorded onto the inserted disc and normally performing the reproducing operation for the audio and MP3 tracks recorded onto the inserted disc.

Figure 5:
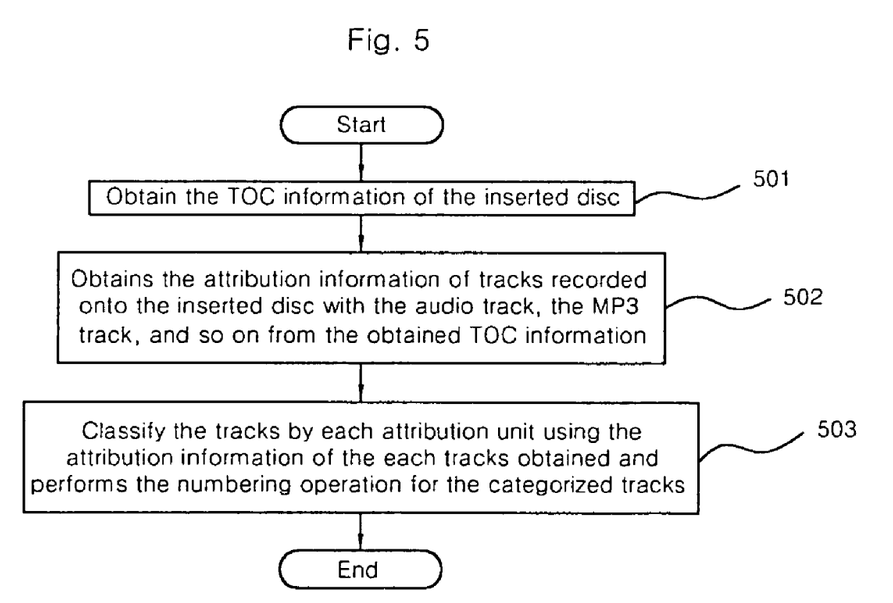
FIG. 5 is a flow chart illustrating the state of categorizing and reproducing tracks of an inserted disc by an attribution unit at an optical disc player in which a method of discriminating the optical disc according to the present invention is applied.

FIG. 5 is a flow chart illustrating the state of classifying and reproducing tracks of the inserted disc by the attribution unit at the optical disc player in which the method of discriminating the optical disc according to the present invention is applied.

With reference to FIGS. 1 and 5, the disc discrimination section 102 of the optical disc player obtains the TOC information of the inserted disc 101 (501 step). Subsequently, the disc discrimination section 102 obtains the attribution information of tracks recorded onto the inserted disc 101 with the audio track, the MP3 track, and so on from the obtained TOC information at 501 step (502 step).

In this stage, the disc discrimination section 102 obtains the attribution of each track by referring the extension information of each track from the obtained TOC information. For example, the disc discrimination section 102 discriminates the object track as the audio tracks if the track extension is "wav", and as the MP3 tracks if the track extension is "mp3".

Subsequently, the optical disc player categorizes the tracks by each attribution unit using the attribution information of the each tracks obtained at 502 step and performs the numbering operation for the categorized tracks (503 step). Thus, the optical disc player performs the numbering operation by the audio or the MP3 tracks, if the audio and the mP3 tracks are mixed.

At this stage, the information for the MP3 track recorded onto the inserted disc 101 can be provided with a formation of a file system having a tree structure, and there are many method of numbering the MP3 track recorded onto the inserted disc 101.

Now, the method of numbering the MP3 track from the file system of the MP3 track having the tree structure will be explained referring to FIGS. 6 and 7.

Figure 6:
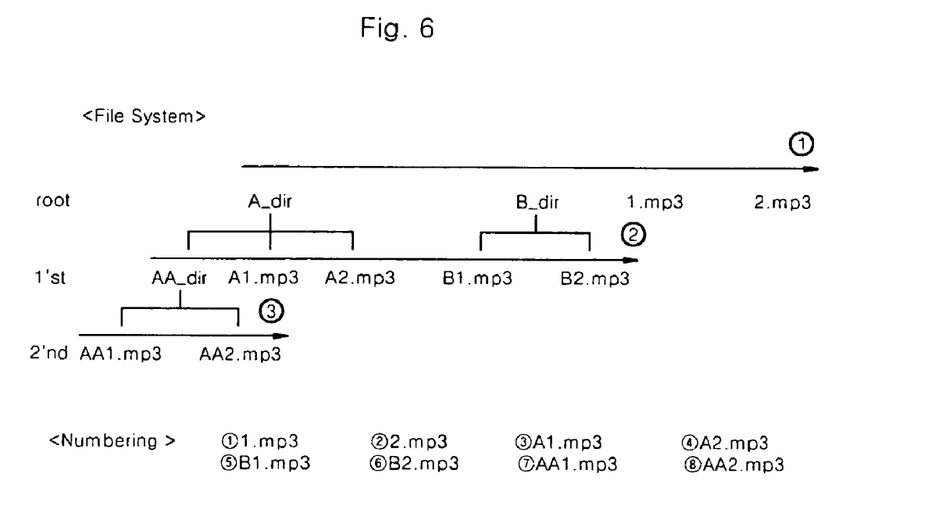
FIG. 6 illustrates a concept of numbering MP3 tracks of an inserted disc at an optical disc player in which a method of discriminating the optical disc according to the present invention is applied.
Figure 7:
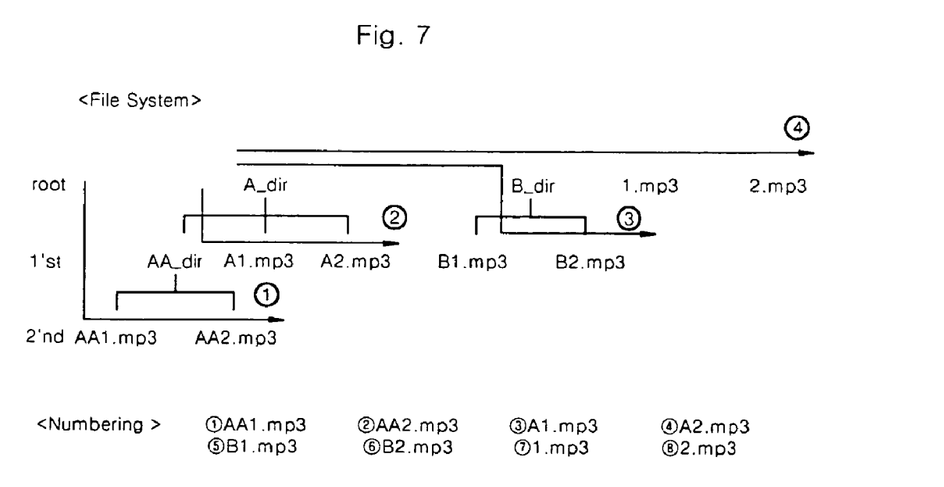
FIG. 7 illustrates the other concept of numbering MP3 tracks of an inserted disc at an optical disc player in which a method of discriminating the optical disc according to the present invention is applied.

FIG. 6 illustrates a concept of numbering MP3 tracks of the inserted disc at an optical disc player in which the method of discriminating the optical disc according to the present invention is applied, while FIG. 7 illustrates the other concept of numbering MP3 tracks of the inserted disc at the optical disc player in which a method of discriminating the optical disc according to the present invention is applied.

Specially, FIG. 6 illustrates a case that of sequentially numbering the MP3 tracks according to a horizontal hierarchy of the tree structure referring to the file system of the MP3 track recorded onto the inserted disc 101.

In FIG. 6, the root has two sub directory folders A_dir and B_dir and two MP3 tracks 1.mp3 and 2.mp3. Also, the sub directory A_dir includes a sub directory folder AA_dir and two MP3 tracks A1.mp3 and A2.mp3, the other sub directory B_dir includes two MP3 tracks B1.mp3 and B2.mp3. Further, the sub directory folder AA_dir includes two MP3 tracks AA1.mp3 and AA2.mp3.

The file system can be classified three hierarchies such as a root (A_dir, B_dir, 1.mp3, and 2.mp3), the first hierarchy (AA_dir, A1.mp3, A2.mp3, B1.mp3, and B2.mp3) and the second hierarchy (AA1.mp3, and AA2.mp3).

Accordingly, if the MP3 tracks recorded onto the inserted disc 101 are sequentially numbered according to the horizontal hierarchy of the tree structure, the order of the MP3 tracks are followed order that 1.mp3, 2.mp3, A1.mp3, A2.mp3, B1.mp3, B2.mp3, AA1.mp3, and AA2.mp3. The optical disc player can normally reproduce a desired track due to communize the numbering information at both the user and the optical disc player, even if the user inputs a command of reproducing the n-th MP3 track.

Meanwhile, FIG. 7 illustrates a case that of sequentially numbering the MP3 tracks according to a vertical hierarchy of the tree structure referring to the file system of the MP3 track recorded onto the inserted disc 101, and two file systems shown in FIGS. 7 and 6 have the same structure in a preferred embodiment of the present invention.

The file system of FIG. 7 can be analyzed by the vertical hierarchy and the result is followed order that [A_dir-AA_dir-(AA1.mp3, AA2.mp3)], [A_dir-(A1.mp3, A2.mp3)], [B_dir-(B1.mp3, B2.mp3)], and [(1.mp3, 2.mp3)].

Here, the vertical hierarchy means a vertical path linked from a node of the tree structure to a leaf by way of each branch. Accordingly, if the MP3 tracks recorded onto the inserted disc 101 are sequentially numbered according to the vertical hierarchy of the tree structure, the order of the MP3 tracks are followed order that AA1.mp3, and AA2.mp3, A1.mp3, A2.mp3, B1.mp3, B2.mp3, 1.mp3, 2.mp3.

Also, the numbering order can be changed depend on an arrangement reference for the numbering such as an ascending or descending order in the case that of numbering the MP3 tracks according to the horizontal or vertical hierarchy as described in FIGS. 6 and 7.

While, the optical disc displayer arranges the MP3 tracks on the basis of a specific field referring to the file system information of the obtained MP3 track and numbers according to the arranged result. For example, the optical disc player can arrange and number the MP3 tracks on the basis of an MP3 track name, an MP3 tracks playing time, and an MP3 tracks storing time referring to the file system information of the obtained MP3 track.

Figure 8:
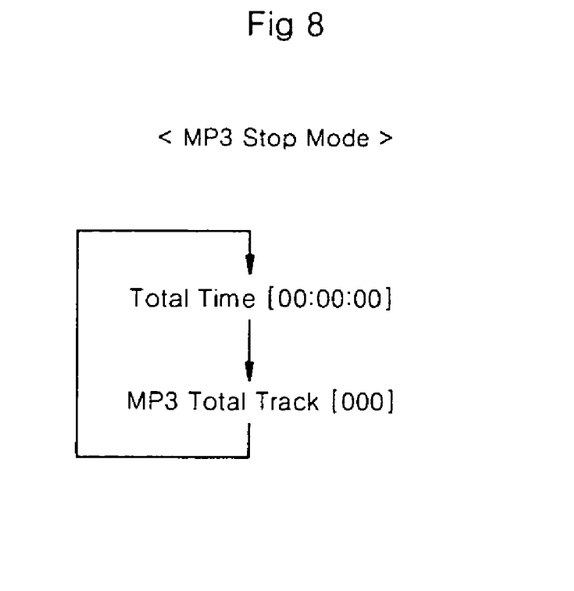
FIG. 8 illustrates the state of a screen displayed on a displaying section in an MP3 stop mode at an optical disc player in which a method of discriminating the optical disc according to the present invention is applied.
Figure 9:
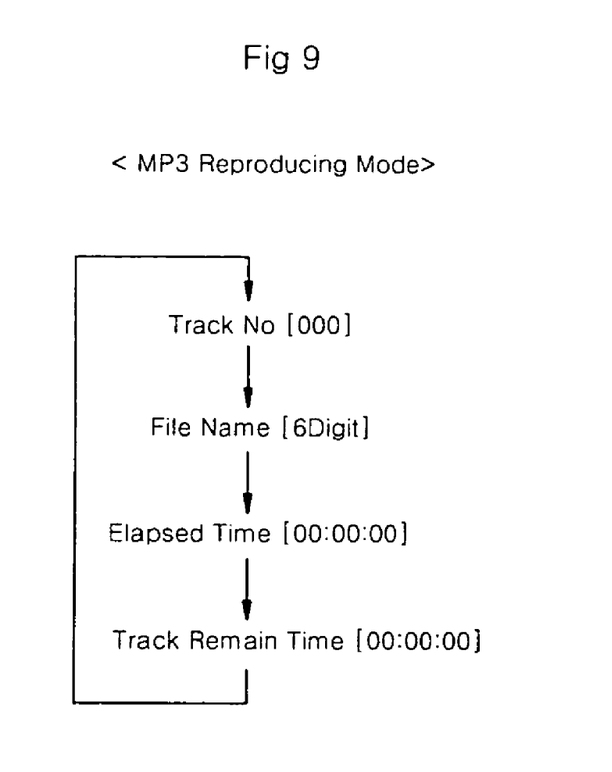
FIG. 9 illustrates the state of a screen displayed on a displaying section in an MP3 play mode at an optical disc player in which a method of discriminating the optical disc according to the present invention is applied.

Further more, the optical disc player displays the information of the MP3 tracks which is reproducing at present and recorded onto the inserted disc, if the user inputs the play key as shown in FIGS. 8 and 9.

FIG. 8 illustrates the state of a screen displayed on a displaying section in the MP3 stop mode at the optical disc player in which the method of discriminating the optical disc according to the present invention is applied, and FIG. 9 illustrates the state of the screen displayed on the displaying section in the MP3 play mode at the optical disc player in which the method of discriminating the optical disc according to the present invention is applied.

With reference to FIG. 9, the optical disc player displays the playing time of the total MP3 tracks recorded onto the disc such as "Total time [01:59:58]" on a displaying section in the MP3 stop mode, if the user inputs the play key. And if the user inputs the play key again, the number of the total MP3 tracks recorded onto the disc such as "MP3 Total Track [215]" is displayed on the displaying section.

But, the optical disc player repeatedly displays the two displaying modes of "Total time [01:59:58]" and "MP3 Total Track [215]" on the displaying section, if the user inputs the play key in the MP3 stop mode that the optical disc player is not reproduced at present.

With reference to FIG. 9, the optical disc player displays the MP3 track number which is reproduced at present such as "Track No. [001]" on a displaying section in the MP3 play mode, if the user inputs the play key.

And if the user inputs the play key again, the file or music name of the MP3 track reproduced at present such as "File Name [000000]" within 6 digits on the displaying section. At this stage, the file name is displayed as the file name recorded onto the disc, and the character numbers of the file name displaying onto the displaying section will be changed depend on the digit number of the displaying section.

Also, the user inputs the play key again, a play pass time for the MP3 track reproducing at present such as "Elapsed Time [01:20:30]" is displayed, while a play remain time for the MP3 track reproducing at present such as "Track Remain Time [01:40:30] is subsequently displayed, if the user inputs the play key again.

Accordingly, the optical disc player sequentially displays "Track No. [001]", "File Name [000000]", "Elapsed Time [01:20:30]", and "Track Remain Time [01:40:30], if the user inputs the play key under reproducing the MP3 track.

But, the information of the MP3 file or music that is displayed on the displaying section will be differently displayed for the order described in previous according to an establishment of the optical disc player.

According to the method of reproducing the optical disc player of the present invention, there is provided the advantages that of classifying and numbering the audio and the MP3 tracks recorded onto the inserted disc, and normally performing the reproducing operation for the audio and the MP3 tracks for the user's command for reproducing.

Figure 10:
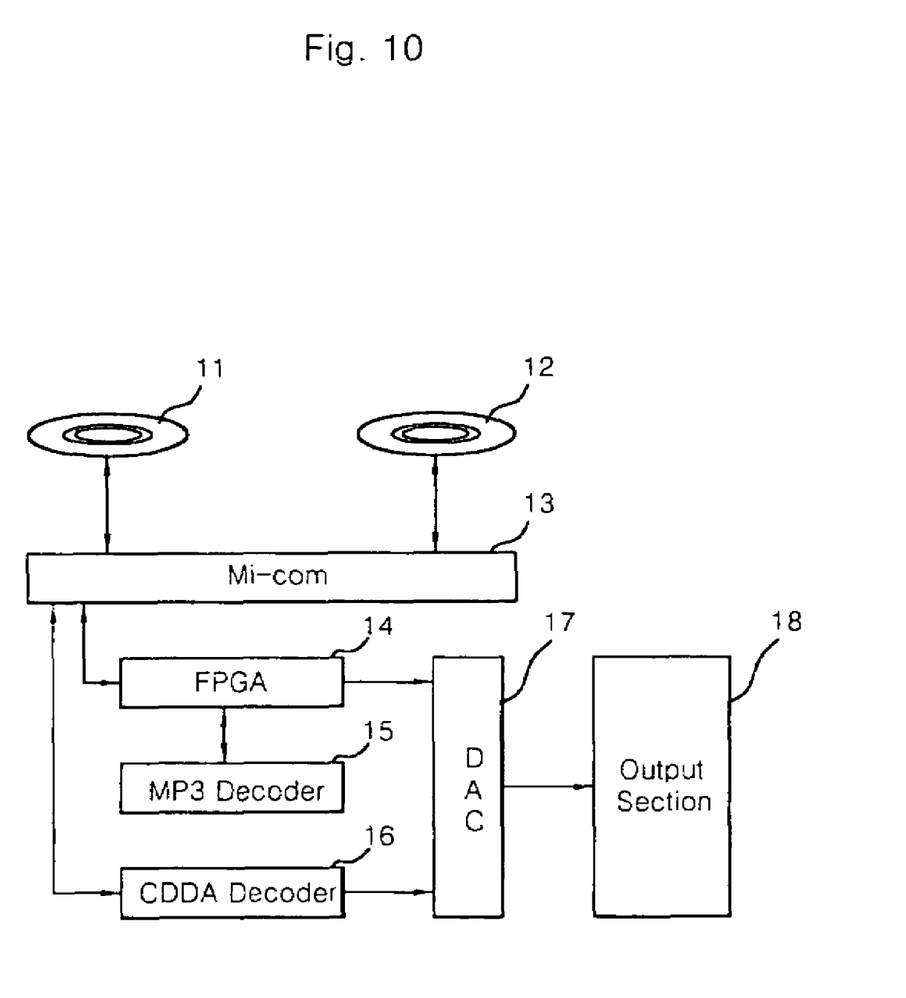
FIG. 10 is a block diagram illustrating a construction of an optical disc player including an MP3 reproducing means according to the present invention.

FIG. 10 is a block diagram illustrating a construction of the optical disc player including the MP3 reproducing means according to the present invention. In a preferred embodiment of the invention in FIG. 10, the optical disc player is a double deck type disc player having two disc drivers.

With reference to FIG. 10, the optical disc player including the MP3 reproducing means includes a first disc driver 11 (e.g. for the disc player only) for receiving a disc; a second disc 12 driver (e.g. for disc writer or player) for receiving the other disc; a Mi-com 13 (as a first control section) for obtaining the attributive information of the tracks of each disc inserted each disc driver 11 or 12 and performing an overall control for the optical disc player; a FPGA(Field Programmable Gate Array) 14 (as a second control section) for receiving the MP3 track data from the Mi-com 13 and converting the received MP3 track data into a decodable data, and controlling a decoding order for the converted data; an MP3 decoder 15 for decoding the converted MP3 track data provided from the FPGA 14 and forwarding the decoded data to the FPGA 14; a CDDA decoder 16 for receiving a CDDA track data provided from the Mi-com 13, and decoding the CDDA track data; a digital to analog converter 17 for converting the converted MP3 track data provided from the FPGA 14 into an analog data; and an output section 18 for outputting the converted analog data provided from the digital to analog converter 17.

In the preferred embodiment of the present invention, the Mi-com 13 is used as the first control section and the FPGA 14 is used as the second control section designed using the logical operation by a system designer, but it will be understood by those skilled in the art that various changes in form.

Now, the operation of the optical disc player including the MP3 reproducing means according to the present invention will be explained with FIG. 11.

Figure 11:
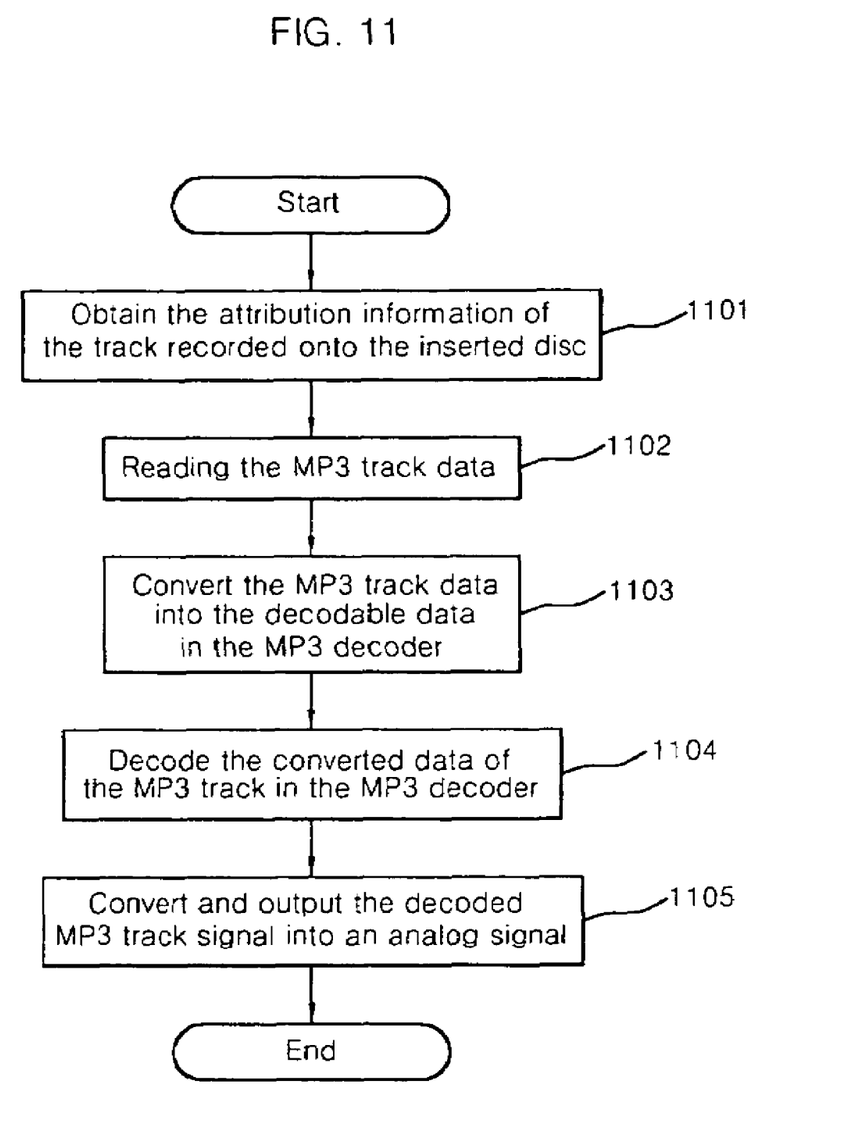
FIG. 11 is a flow chart illustrating the state of reproducing an MP3 file at an optical disc player including an MP3 reproducing means according to the present invention.

FIG. 11 is a flow chart illustrating the state of reproducing the MP3 file at the optical disc player including the MP3 reproducing means according to the present invention.

With reference to FIGS. 10 and 11, the Mi-com 14 obtains the attribution information of the track recorded onto the inserted disc (1101 step).

Here, the Mi-com 13 obtains the attribution information using the track extension information recorded onto the disc from the TOC information obtained from the inserted disc.

For example, the optical disc player discriminates the object track as the audio tracks if the track extension is "wav", and as the MP3 tracks if the track extension is "mp3".

In FIG. 10, each disc driver 11 or 12 has the Mi-com 13 to control each inserted disc into two disc drivers 11 and 12, respectively.

Next, the optical disc player reads the MP3 track data recorded onto the inserted disc under reproducing the MP3 track (1102 step). At this time, the CDDA decoder 16 could not decode the MP3 track data because the data formations of the MP3 track and CDDA track are different each other.

Accordingly, the FPGA 14 converts the MP3 track data into the decodable data, and forwards the decoded data to the MP3 decoder 15 (1103 step).

At this time, the FPGA 14 can determine a priority for forwarding the converted data to the MP3 decoder 15 according to an originating driver from the first or second driver 11 or 12 when the converted data is forwarded to the MP3 decoder 15.

Subsequently, the MP3 decoder 15 decodes the converted data of the MP3 track provided from the FPGA 14 and forwards the decoded signal to the FPGA 14 again (1104 step).

It is desirable that the FPGA 14 includes a first and a second slave FPGAs for converting the MP3 track data recorded onto the disc inserted into the first and the second disc drivers 11 and 12 into decodable data, and a master PFGA for controlling the decoding order for the converted signal of the first and the second slave FPGAs.

Meanwhile, it can be designed the optical disc player having new functions that the master FPGA can include a function of converting the MP3 track data, recorded onto the disc inserted into the first disc driver 11, into the decodable data and a separated slave FPGA include a function of converting the MP3 track data, recorded onto the disc inserted into the second disc driver 12, into the decodable data.

In the preferred embodiment of the present invention, the disc drive is applied with the double deck having two disc drivers. But, each disc driver can have the slave FPGA, respectively, if many disc drivers are applied into the optical disc player.

Meanwhile, the FPGA 14 forwards to the decoded MP3 track signal to the analog to digital converter 17. The analog to digital converter 17 converts the decoded MP3 track signal into the analog signal and outputs through the output section 18 to perform the reproducing operation for the MP3 track (1105 step).

According to the optical disc player of the present invention, there is provided the advantages that of obtaining the track attribution recorded onto the inserted disc, and normally performing the reproducing operation for the MP3 track the disc inserted into the plurality of disc drivers using one MP3 decoder.

Also, the manufacturing cost of the optical disc player can be reduced by reproducing the MP3 track recorded onto the disc inserted into the plurality of disc drivers using only one MP3 decoder.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for reproducing audio information stored on a disc, said audio information including one or more music files each having a file name extension, said apparatus comprising:

a reader to detect said disc and access the audio information from the detected disc; and a controller operable to identify a type of audio information based on a file name extension of the audio information, including identifying the one or more music files based on a file name extension, wherein the controller is operable to automatically establish a reproducing mode for the audio information based on the identified type of audio information and to automatically initiate playback of said audio information based on the established reproducing mode.

2. The apparatus of claim 1, wherein at least one of the music files is a MP3 file having a .MP3 file extension.

3. The apparatus of claim 2, wherein the controller is a non-general purpose controller.

4. The apparatus of claim 3, wherein the non-general purpose controller is application-specific circuitry.

5. The apparatus of claim 3, wherein the non-general purpose controller is programmable circuitry.

6. The apparatus of claim 5, wherein the non-general purpose controller is a microcontroller configured to detect the one or more MP3 files.

7. The apparatus of claim 5, wherein the non-general purpose controller is configured to identify a type of audio information based on the file name extension of the audio information, including identifying the one or more MP3 files based on a .MP3 file extension.

8. The apparatus of claim 5, wherein the non-general purpose controller is configured to automatically establish a reproducing mode for the audio information based on the identified type of audio information and to automatically reproduce said audio information based on the established reproducing mode.

9. The apparatus of claim 5, wherein the non-general purpose controller includes circuitry configured to identify a type of audio information based on the extension of the audio information, including identifying the one or more MP3 files based on a MP3 file extension, and wherein the controller is circuitry configured to automatically establish a reproducing mode for the audio information based on the identified type of audio information and to automatically reproduce said audio information based on the established reproducing mode.

10. The apparatus of claim 5, wherein the non-general purpose controller is operable to organize and number the one or more MP3 files based on a hierarchy of a tree structure.

11. The apparatus of claim 10, wherein the non-general purpose controller is operable to reproduce audio information starting with the lowest or highest numbered MP3 file.

12. The apparatus of claim 11, wherein the non-general purpose controller is operable to reproduce the one or more MP3 files in the order of said numbering.

13. The apparatus of claim 10, wherein the hierarchy of a tree structure includes one or more root folders having one or more MP3 files.

14. The apparatus of claim 13, wherein the root folders include one or more subfolders having one or more MP3 files.

15. The apparatus of claim 14, wherein the non-general purpose controller is operable to automatically detect the hierarchy of the tree structure and discriminate the one or more MP3 files therein in accordance with the tree structure hierarchy.

16. The apparatus of claim 15, wherein the non-general purpose controller is operable to automatically establish a reproducing mode for the audio information based on the identified type of audio information and to automatically reproduce said audio information based on the established reproducing mode and in accordance with the hierarchy of the tree structure.

17. The apparatus of claim 14, further comprising a display configured to display the name of the one or more root folders or subfolders.

18. The apparatus of claim 5, wherein the non-general purpose controller is further operable to generate a display of an error indication when the audio information does not construct normal MP3 audio data.

19. The apparatus of claim 18, wherein the non-general purpose controller is further operable to reproduce the audio information when the audio information constructs normal MP3 data; and to skip the audio information when the audio information does not construct normal MP3 audio data.

20. The apparatus of claim 1, wherein at least one of the music files is a WAV file having a .WAV file extension.

21. The apparatus of claim 15, wherein said controller is further operable to establish a first reproducing mode for the accessed audio information when the identified file name extension includes a first extension, and to establish a second reproducing mode for the accessed audio information when the identified file name extension includes a second extension, and to automatically reproduce the accessed audio information based on the established reproducing mode.

22. The apparatus of claim 21, wherein the first extension comprises a .MP3 extension and the second extension comprises an extension other than a .MP3 extension.

23. The apparatus of claim 1, wherein the controller is a field-programmable gate array.

24. The apparatus of claim 1, wherein said controller is further operable to identify a type of audio information as one or more Compact Disc-Digital Audio (CDDA) tracks, to automatically establish a reproducing mode based on the identification of said one or more CDDA tracks, and to automatically reproduce said CDDA tracks based on the established reproducing mode.

25. The apparatus of claim 1, wherein the controller is further configured to automatically change the established reproducing mode when the audio information is not compatible with the established reproducing mode.

26. An apparatus for reproducing audio information stored on a disc, said apparatus comprising:

a reader to detect said disc and access the audio information from the detected disc; and a controller operable to:
   automatically identify an audio type associated with the accessed audio information,
   establish a first reproducing mode for the accessed audio information when the identified audio type includes a first type audio type,
   establish a second reproducing mode for the accessed audio information when the identified audio type includes a second audio type, and automatically reproduce the accessed audio information based on the established reproducing mode.

27. The apparatus of claim 26, wherein the controller is a non-general purpose controller.

28. The apparatus of claim 27, wherein the non-general purpose controller is application-specific circuitry.

29. The apparatus of claim 27, wherein the non-general purpose controller is programmable circuitry.

30. The apparatus of claim 29, wherein the first audio type is a compact Disc-Digital Audio (CDDA) audio type.

31. The apparatus of claim 30, wherein the second audio type is an MP3 audio type.

32. The apparatus of claim 30, wherein the second audio type is a WAV audio type.

33. The apparatus of claim 29, wherein the first audio type is a MP3 audio type.

34. The apparatus of claim 29, wherein the non-general purpose controller is programmed to generate a display of an error indication when the audio information does not construct normal MP3 audio data.

35. The apparatus of claim 29, wherein the non-general purpose controller is operable to automatically reproduce the audio information when the audio information constructs normal MP3 data; and to skip the audio information when the audio information does not construct normal MP3 audio data.

36. The apparatus of claim 29, wherein the non-general purpose controller is operable to detect music files in said audio information and number said music files based on a hierarchy of a tree structure.

37. The apparatus of claim 36, wherein the hierarchy of a tree structure includes one or more root folders having one or more music files.

38. The apparatus of claim 37, wherein the root folders include one or more subfolders having one or more music files.

39. The apparatus of claim 38, wherein the non-general purpose controller is operable to sequentially number the music files for playing based on a hierarchy of a tree structure.

40. The apparatus of claim 39, wherein the non-general purpose controller is operable to reproduce the music files in the order of said numbering.

41. The apparatus of claim 26, wherein the controller is a field-programmable gate array.

42. The apparatus of claim 26, wherein the controller includes circuitry configured to detect one or more music files in said audio information.

43. The apparatus of claim 26, wherein the controller includes circuitry configured to detect one or more music files in said audio information.

44. An apparatus for reproducing audio information stored on a disc, said apparatus comprising:
a reader to detect the disc and access the audio information from the detected disc, said reader responsive to a first controller; and
a second controller, separate from said first controller, operable to:
identify a type of the accessed audio information based on a file name extension associated with the accessed audio information,
automatically establish a reproducing mode for the accessed audio information based on the identified type, and
automatically initiate playback of the accessed audio information based on the established reproducing mode.

45. The apparatus of claim 44, wherein the second controller decodes the accessed audio data in accordance with the identified type; and converts the decoded data to an analog format for audible output.

46. The apparatus of claim 45, wherein the second controller analyzes the audio information; and determines whether the audio information constructs normal MP3 audio data or not, based on results of the analysis.

47. The apparatus of claim 45, wherein the second controller is further operable to generate a display of an error indication when the audio information does not construct normal MP3 audio data.

48. The apparatus of claim 45, wherein the second controller automatically reproduces the audio information when the audio information constructs normal MP3 data; and skips the audio information when the audio information does not construct normal MP3 audio data.

49. The apparatus of claim 44, wherein the second controller is further operable to automatically change the established reproducing mode when the audio information is not compatible with the established reproducing mode.

50. The apparatus of claim 44, wherein the second controller is a non-general purpose controller.

51. The apparatus of claim 50, wherein the non-general purpose controller is application-specific circuitry.

52. The apparatus of claim 50, wherein the non-general purpose controller is programmable circuitry.

53. The apparatus of claim 44, wherein the controller is a field-programmable gate array.

54. A method for reproducing audio information stored on a disc, said audio information including one or more music files each having a file name extension, said method comprising the steps of:
detecting said disc and accessing the audio information from the detected disc;
identifying a type of audio information based on a file name extension of the audio information, including identifying the one or more music files based on a file name extension;
automatically establishing a reproducing mode for the audio information based on the identified type of audio information and to automatically initiating playback of said audio information based on the established reproducing mode.

55. The method of claim 54, wherein at least one of the music files is a MP3 file having a .MP3 file extension.

56. The method of claim 54, wherein at least one of the music files is a WAV file having a .WAV file extension.

57. The method of claim 55, further comprising the step of identifying a type of audio information based on the file name extension of the audio information, including identifying the one or more MP3 files based on a .MP3 file extension.

58. The method of claim 55, further comprising the step of organizing and numbering the one or more MP3 files based on a hierarchy of a tree structure.

59. The method of claim 58, further comprising the step of reproducing audio information starting with the lowest or highest numbered MP3 file.

60. The method of claim 58, further comprising the step of detecting a hierarchy of a tree structure that includes one or more root folders having one or more MP3 files.

61. The method of claim 59, further comprising the step of developing root folders that include one or more subfolders having one or more MP3 files.

62. The apparatus of claim 54, further comprising the step of automatically recognizing the hierarchy of the tree structure and discriminating the one or more MP3 files therein in accordance with the tree structure hierarchy.

* * * * *